(12) United States Patent
Kim et al.

(10) Patent No.: US 6,247,514 B1
(45) Date of Patent: *Jun. 19, 2001

(54) TIRES WITH HIGH STRENGTH REINFORCEMENT

(75) Inventors: Dong Kwang Kim, Akron; Amit Prakash, Hudson, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/768,152

(22) Filed: Dec. 17, 1996

Related U.S. Application Data

(63) Continuation-in-part of application No. 08/514,081, filed on Aug. 11, 1995, now abandoned, and a continuation-in-part of application No. 08/514,080, filed on Aug. 11, 1995, now abandoned, which is a division of application No. 08/360,973, filed on Dec. 20, 1994, now abandoned.

(51) Int. Cl.⁷ .............................. B60C 9/00; B60C 9/02; D07B 1/06

(52) U.S. Cl. .......................... 152/556; 57/902; 152/451; 152/548

(58) Field of Search .................... 152/556, 451, 152/548; 57/902, 212

(56) References Cited

U.S. PATENT DOCUMENTS

| | | | |
|---|---|---|---|
| H1333 | * 7/1994 | Helfer et al. | 152/556 X |
| 4,572,264 | * 2/1986 | Umezawa et al. | 152/556 X |
| 4,960,473 | 10/1990 | Kim et al. | |
| 4,966,216 | * 10/1990 | Kawasaki et al. | 152/556 |
| 4,986,327 | * 1/1991 | Takahira | 152/556 |
| 5,603,208 | * 2/1997 | Fujita et al. | 57/902 X |
| 5,609,013 | * 3/1997 | Kaneda et al. | 57/902 X |
| 5,709,760 | * 1/1998 | Prakash et al. | 152/556 |
| 5,779,829 | * 7/1998 | Prakash et al. | 152/451 X |
| 5,858,137 | * 1/1999 | Assaad et al. | 152/451 X |
| 5,873,962 | * 2/1999 | Kaneko et al. | 152/556 |

FOREIGN PATENT DOCUMENTS

| | | | |
|---|---|---|---|
| 0342492 | 11/1989 | (EP) . | |
| 0644070 | 3/1995 | (EP) . | |
| 64-030803 | * 2/1989 | (JP) | 152/556 |
| 5-117984 | * 5/1993 | (JP) | 57/902 |
| 5-195455 | * 8/1993 | (JP) | 57/902 |
| 6-184962 | * 7/1994 | (JP) | 152/451 |
| 6-184963 | * 7/1994 | (JP) | 152/451 |
| 6-294083 | * 10/1994 | (JP) | 152/451 |
| 9114811 | 10/1991 | (WO) . | |
| 91/14573 | * 10/1991 | (WO) | 152/451 |
| 9707995 | 3/1997 | (WO) . | |
| 9739176 | 10/1997 | (WO) . | |

* cited by examiner

*Primary Examiner*—Adrienne C. Johnstone
(74) *Attorney, Agent, or Firm*—Bruce J Hendricks

(57) ABSTRACT

A strip of tire ply stock is reinforced with steel cords wherein the steel cords are constructed of high strength wire filament having at least a tensile strength of $-2000 \times D + 4400$ MPa where D is the filament diameter in mm. Tires are constructed with the ply stock in the belt and/or carcass.

4 Claims, 4 Drawing Sheets

TIRES WITH HIGH STRENGTH REINFORCEMENT

This is a continuation-in-part of the application Ser. No. 08/514,081, and application Ser. No. 08/514,080, both filed on Aug. 11, 1995 now abandoned, each of which is a division of application Ser. No. 08/360,973, filed on Dec. 20, 1994, now abandoned.

BACKGROUND OF THE INVENTION

The present invention relates to cord, cord reinforced plies and radial tires for vehicles. Radial tires are those tires wherein the cords of the carcass plies, which extend from one bead to the other, lie substantially on radial planes. More particularly, the present invention relates to a structure of one or more plies formed of a cord reinforced composite having rubber where preferably the structure is for tires, such as for a tire carcass or a tire belt wherein at least one of the plies in the carcass or belt has the cords therein biased with respect to the direction of rotation of the tire.

Reinforced elastomeric articles are well known in the art. For example, conveyor or like type belts, tires, etc., are constructed with cords of textile and/or fine steel wire filaments or strands. In particular, belts used in pneumatic tires are constructed of up to eight ply layers with the cord reinforcement of adjacent plies being biased with respect to the direction of movement of the tire where it is desired to reinforce in both the lateral direction and the direction of rotation of the tire. Further, cords made of strands of multi-twisted filaments of fine wire with a single strand construction having two or more filaments and a wrap filament thereabout to reinforce the cord structure have also been known. In some cases, the reinforcement includes the use of single strand cords of multi-filaments which are not twisted about each other but rather twisted altogether as a bundle or bunch (bunched cord) to simplify the cord construction, as disclosed in assignees's U.S. Pat. No. 4,947,636 which is incorporated by reference in its entirety herein. Higher fatigue life requirements for composites in tires have resulted in cords with smaller filament diameter requiring more filaments in the cord to obtain the necessary strength.

Two ply tire belts for passenger and light truck tires can have cords of 2x.255ST and 2+2x.32-.40ST, respectively. An example of the first construction is described in Assignee+s Statutory Invention Registration H1333, issued Jul. 5, 1994, which application is incorporated by reference in its entirety herein, wherein multi-filament cords such as 2X.255ST are disclosed. This designation means one cord of two (2) 0.255 mm. diameter filaments. An example of the 2+2x.32-.40ST cord is disclosed in Assignee's U.S. Pat. No. 5,242,001, which is incorporated in its entirety by reference herein. This designation means one cord of four (4) 0.32-.40 mm. diameter filaments (with two (2) filaments twisted at a shorter lay length than the other two (2) filaments). Multi-filament cords such as 2+x.32-.40ST have been found necessary to meet the higher demand of strength for composites in tire belts, typically used in light truck applications. Both of these cords were made of super tensile (ST) steel as defined hereinafter. Though cord designs incorporating super tensile (ST) steel have proven effective, there is a continuing need to develop lighter weight cord constructions with improved characteristics, such as higher corrosion propagation resistance and improved tire performance, over recent high tensile and super tensile constructions.

The described cord constructions generally have not found use in larger tires, such as off-the-road (OTR) tires, because they were not strong enough. Even with the advent of high tensile filament such as in Assignee's 2+2x cord, disclosed for use in passenger and light truck tires, the large OTR tires continue to use traditional constructions such as 7x7x.25+1HT and 3x7x.22HE comprising seven strands each of seven 0.25 mm diameter high tensile filaments that are twisted together and spiral-wrapped; and three strands each of seven 0.22 mm diameter high tensile filaments that are twisted together, respectively. The steel cord cable currently used for ply reinforcement in OTR tires for sizes 36.00R51 and larger is stranded cord of high tensile tire cord filament such as 7x19x.20+1HT cord comprising seven strands each of nineteen 0.20 mm diameter high tensile filaments that are twisted together and spiral-wrapped. These cords were made of high tensile (HT) steel as defined hereinafter.

More recently, OTR tires can be constructed of multiple plies belts or single ply with reinforcing cords such as 27x.265ST or 5+8+14x.265ST+1 as disclosed in Assignee's U.S. Pat. No. 5,318,643 which patent is incorporated by reference in its entirety herein. Still, current steel cord constructions have breaking load and cable gauge limitations preventing the needed design inch-strength from being achieved for tires larger than 40.00R57 used on trucks and earthmovers weighing up to and sometimes more than 320 tons. In addition, there is a need to increase the rivet area in the ply and belt, i.e., the space between the cords, for tire sizes of 36.00R51 and larger so that more rubber can penetrate between the cords during tire manufacture to enhance the quality of calendered treatment by preventing "weak rivet" or "loose coat" (which can result in trapped air in tires).

Many problems have had to be overcome even after development of the above higher strength filaments and cords. The higher strength steel alloys resulted in changes in cord modulus giving rise to the possibility of adjusting the parameters of a tire belt gross load which depends upon three factors assuming adequate cord to rubber adhesion. The factors are cord modulus, the ratio of cord volume to rubber volume (often expressed as the number of cord ends per inch (epi)), and the angle of cord reinforcement. Further, as the angle of cord reinforcement approaches the direction of rotation of the tire, the support from the reinforcement in the lateral direction moves toward zero. An increase in the above-mentioned two other cord related factors, i.e., the cord modulus and the ratio of cord volume to rubber volume, generally results in an increase of weight for the belt. Added weight can mean added cost, higher rolling resistance and lower fuel economy of a tire. Simply using lighter cords with a lower modulus does not solve the problem because, even though they have lower weight, the lower cord modulus must be offset by increasing the ratio of cord to rubber volume. This increase in cord volume is limited by the physical size of the cord and the resulting spacing between the cords which governs the amount of rivet, i.e., the ability of the rubber to penetrate between the cords for good cord to rubber adhesion.

It is an object of the present invention to determine cord structures which could take advantage of a new cord modulus while not adversely affecting cord volume to rubber volume ratio on lateral reinforcement so as to obviate the problems and limitations of the prior art tires and cord constructions.

It is another object of the present invention to provide cord structures using ultra tensile wire which results in lighter weight tires.

It is still another object of the present invention to provide cord structures using ultra tensile wire which results in tires with higher corrosion propagation resistance and more rivet leading to improved tire performance.

SUMMARY OF THE INVENTION

The present invention relates to a cord for reinforcing elastomer articles of multiple filaments having a diameter (D) ranging from 0.10 to 0.45 mm, each filament having at least a tensile strength of $-2000 \times D + 4400$ MPa, where D is the filament diameter. These cords are particularly useful in a carcass ply and/or belt structure of a pneumatic tire.

DETAILED DESCRIPTION OF THE INVENTION

Figure 1:
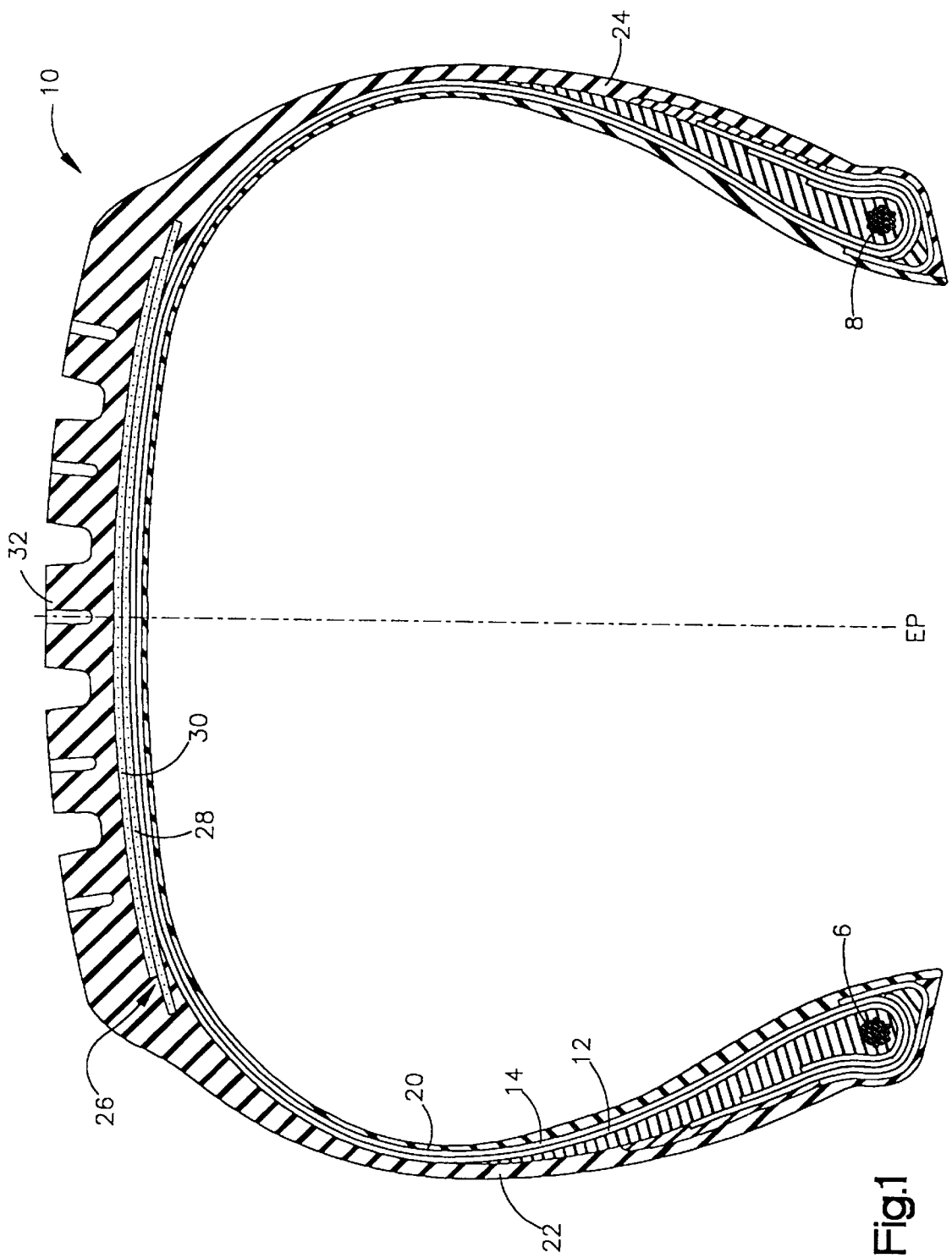
FIG. 1 illustrates the cross section of a first embodiment of a tire having a composite structure including two plies according to the present invention.

There is disclosed a cord for reinforcing elastomer articles of multiple filaments having a diameter (D) ranging from 0.10 to 0.45 mm, each filament having at least a tensile strength of $-2000 \times D + 4400$ MPa, where D is the filament diameter. These cords are particularly useful in a carcass ply and/or belt structure of a pneumatic tire.

There is also disclosed a pneumatic tire with a carcass having parallel cords, two sidewalls spaced apart a distance, which in the axial direction determines the general width of the tire section, two beads each one of which around which are turned up, from the inside toward the outside, the ends of the cords of the carcass, a tread disposed on the crown of said carcass, a belt structure that is circumferentially inextensible interposed between the tread and the carcass, and carcass plies disposed in said sidewalls between said two beads and said crown of said carcass, said belt structure having a width that is substantially equal to that of the tread and having carcass plies of elastomeric fabric reinforced with metallic cords, said metallic cords being comprised of a plurality of filaments having a diameter (D) ranging from 0.10 to 0.45 mm, each filament having a tensile strength of $-2000 \times D + 4400$ MPa, where D is the filament diameter.

In addition, there is disclosed a pneumatic tire with a carcass having parallel cords, two sidewalls spaced apart a distance, which in the axial direction determines the general width of the tire section, two beads each one of which around which are turned up, from the inside toward the outside, the ends of the cords of the carcass, a tread disposed on the crown of said carcass, a belt structure that is circumferentially inextensible interposed between the tread and the carcass, and carcass plies disposed in said sidewalls between said two beads and said crown of said carcass, said belt structure having a width that is substantially equal to that of the tread and being constructed of at least one belt of elastomeric fabric reinforced with metallic cords, said metallic cords being comprised of a plurality of filaments having a diameter (D) ranging from 0.10 to 0.45 mm, each filament having a tensile strength of $-2000 \times D + 4400$ MPa, where D is the filament diameter.

After considerable study, effort, testing and time, the present invention provides cords and plies for passenger, light truck, truck, medium truck and OTR tires which substantially reduce the size and sometimes the number of filaments for the load ranges encompassed by this range of tires. While the reduction in the number of filaments leads one to expect a reduction in weight, this is not necessarily the case since the prior art materials require that the filament size also be increased in order to obtain the needed strength for the tire. However, with the use of Ultra Tensile steel for the cord constructions, the number and/or the size of the filaments can be decreased while maintaining or even strengthening the tire. Under such circumstances, cord was found for use in the load ranges by varying the ends per inch (EPI) in the plies of the belt. Other advantages which exist in the present invention include lighter tires, improved rolling resistance, higher corrosion propagation resistance, and a reduction in the cord treatment gauge between the cord layers in the belt. A weight reduction due to a reduction in weight of reinforcement as well as a reduction in an amount of gum gauge also results in a reduction in manufacturing cost and improved fuel economy for the tires of the present invention. Moreover, it is believed that improved temperature transfer can be achieved with the new cord designs of the invention to lengthen the life and improve the operating performance of tires incorporating these cords. Further, the new belt structures give better rolling resistance, perhaps because of the lighter weight of the new cord designs as compared with the old cord designs being used for reinforcement in the belt structure.

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design of the tire rim.

"Belt structure" means at least two layers or plies of parallel cords, woven or unwoven, underlying the tread, unanchored to the bead, and having both left and right cord angles in the range from about 17 to about 70 degrees with respect to the equatorial plane (EP) of the tire.

"Carcass" means the tire structure apart from the belt structure, the tread, the undertread and the sidewall rubber over the plies, but including the beads.

"Cord" means one or more of the reinforcement elements, formed by two or more filaments/wires which may or may not be twisted or otherwise formed and which may further include strands that may or may not be also so formed, of which the plies in the tire are comprised.

"Crown" means that portion of the tire within the width limits of the tire tread.

"Density" means weight per unit length.

"Equatorial plane (EP)" means the plane perpendicular to the tire's axis of rotation and passing through the center of the tire's tread.

"Gauge" means material thickness.

"High Tensile Steel (HT)" means a carbon steel with a tensile strength of at least 3400 Mpa @ 0.20 mm filament diameter.

"Super Tensile Steel (ST)" means a carbon steel with a tensile strength of at least 3650 Mpa @ 0.20 mm filament diameter.

"Ultra Tensile Steel (UT)" means a carbon steel with a tensile strength of at least 4000 Mpa @0.20 mm filament diameter.

"Load Range" means load and inflation limits for a given tire used in a specific type of service as defined by tables in *The Tire and Rim Association, Inc. 1989 Year Book.*

"Radial" and "radially" are used to mean directions radially perpendicular from the axis of rotation through the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Stiffness ratio" means the value of the control belt structure stiffness divided into the value of another belt structure stiffness when the values are determined by a fixed three (3) point bending test having both ends of the cord supported and flexed by a load centered between the fixed ends.

The cords of the present invention may comprise of a number of constructions both with or without a spiral wrap. For example, representative constructions include 2x, 3x, 4x, 5x, 6x, 7x, 8x, 11x, 12x, 27x, 1+2, 1+3, 1+4, 1+5, 1+6, 1+7, 1+8, 1+14, 1+15, 1+16, 1+17, 1+18, 1+19, 1+20, 1+26, 2+2, 2+5, 2+6, 2+7, 2+8, 2+9, 2+10, 2/2, 2/3, 2/4, 2/5, 2/6, 3+2, 3+3, 3+4, 3+6, 3+9, 3/9, 3++9+15, 4×4, 5/8/14, 7×2, 7×3, 7×4, 7×7, 7×12 and 7×19. Representative cord constructions with a spiral wrap include 2+1, 3+1, 5+1, 6+1, 7+1, 8+1, 11+1, 12+1, 1+4+1, 1+5+1, 1+6+1, 1/6+1, 1+7+1, 1+8+1, 1+14+1, 1+15+1, 1+16+1, 1+17+1, 1+18+1, 1+19+1, 1+20+1, 1+26+1, 2+7+1, 2+8+1, 2+9+1, 2+10+1, 3+9+1, 3/9+1, 3+9+15+1, 7×2+1, 7×12+1, 7×19+1 and 27+1.

The cords listed above are particularly suited for use in a pneumatic tire. The pneumatic tire may be a bias or radial ply tire. When used in the carcass ply, the preferred cords are 2x, 3x, 4x, 5x, 6x, 8x, 11x, 12x, 1+2, 1+3, 1+4, 1+5, 1+6, 1+7, 1+8, 1+14, 1+15, 1+16, 1+17, 1+18, 1+19, 1+20, 2+1, 2+7, 2+8, 2+9, 2+10, 2/2, 2/3, 2/4, 2/5, 2/6, 3+1, 3+2, 3+3, 3+4, 3+9, 3/9, 3+9+15, 5/8/14, 7×12, 7×19, 5+1, 6+1, 7+1, 8+1, 11+1, 12+1, 2+7+1, 1+4+1, 1+5+1, 1+6+1, 1+7+1, 1+8+1, 1+14+1, 1+15+1, 1+16+1, 1+17+1, 1+18+1, 1+19+1, 1+20+1, 3+9+1, 3/9+1, 7×12+1 and 7×9+1.

When the cords of the present invention are used in a belt structure, the preferred cords are 2x, 3x, 4x, 5x, 6x, 8x, 11x, 12x, 1+2, 1+3, 1+4, 1+5, 1+6, 1+7, 1+8, 1+14, 2+2, 2+5, 2+6, 2+7, 2+8, 2+9, 2+10, 2+2+8, 2/2, 2/3, 2/4, 2/5, 2/6, 3+2, 3+3, 3+4, 3+6, 3+9, 3+9+15, 27x, 1+26, 4×4, 5/8/14, 7×2, 12+1, 3+9+1, 1+6+1, 2+6+1, 2+7+1, 2+8+1, 2+9+1, 2+10+1, 2+2+8+1, 3+9+15+1, 27+1, 1+26+1 and 7×2+1.

The filaments which may be used to make the cords of the present invention may have a diameter ranging from 0.10 mm to 0.45 mm. Preferably, the diameter of the filament ranges from 0.14 to 0.43 mm. A particularly preferred filament ranges from 0.18 to 0.38 mm.

According to the invention, a pneumatic off-the-road tire of 36 inch and greater bead diameter with a carcass having cords, two sidewalls spaced apart a distance, which in the axial direction determines the general width of the tire section, two beads around each one of which are turned up the ends of the cords of the carcass, a tread disposed on the crown of the carcass, and a belt structure circumferentially disposed between the tread and the carcass is disclosed. The belt structure has a width that is substantially equal to that of the tread and has at least one layer of elastomeric fabric reinforced with metallic cords. The metallic cords of the present invention are used in at least one layer such as a 7×19×.20+1 construction. In another embodiment, a pneumatic off-the-road tire incorporates metallic cords of the present invention in a 7×12×22×.22+1 construction. In a third embodiment, a pneumatic off-the-road tire incorporates metallic cords of the present invention having a 7×12×25×.25+1 construction.

There are a number of embodiments of metallic cord construction of the present invention for the plies including 1x.18, 2x.18, 3x.18. Also, according to the invention, the cords of the ply can be constructed of 1+5x.18. The tire can also include a ply having a cord of 1x.24/6x.22+1 or 1x.18/6x.16+1 construction.

According to the invention, the pneumatic radial tire described before can include a belt structure of elastomeric fabric reinforced with metallic cords where the metallic cords are parallel to each and composed of filaments of ultra tensile steel. In one embodiment, the belt structure includes first and second overlapped belts wherein the cords of the first and second belts are constructed of cords of the present invention having various configurations including, 2+2x.30, 2+2x.35, 2x.30, 2x.35, 2+2x.30, 2x.23, 2x.30, 3+2x.33 and 3+4x.38.

In another embodiment of the former tire, the belt structure includes first, second, third and fourth radially overlapped belts wherein the cords of the present invention used in the first and fourth belt are constructed of 3+2x.33 and the cords of the present invention used in each of the second and third belts, sandwiched between the first and fourth belts are constructed of 3+3x.33. This tire also includes a ply having a cord of the present invention in a 3x.22/9x.20+1 construction. In still another embodiment, the belt structure includes first, second, third and fourth radially overlapped belts wherein the cords of each of the present invention are used in each of the first and fourth belts are constructed of 3+4x.38 and the ply has a cord of 3x.22/9x.20+1.

Further, many of the above described novel cords result in lower linear density in the reinforcement for which they are used which again results in less weight and lower cost for the reinforcement and its product, be it the tire, the belt or any other reinforced elastomeric.

Figure 2:
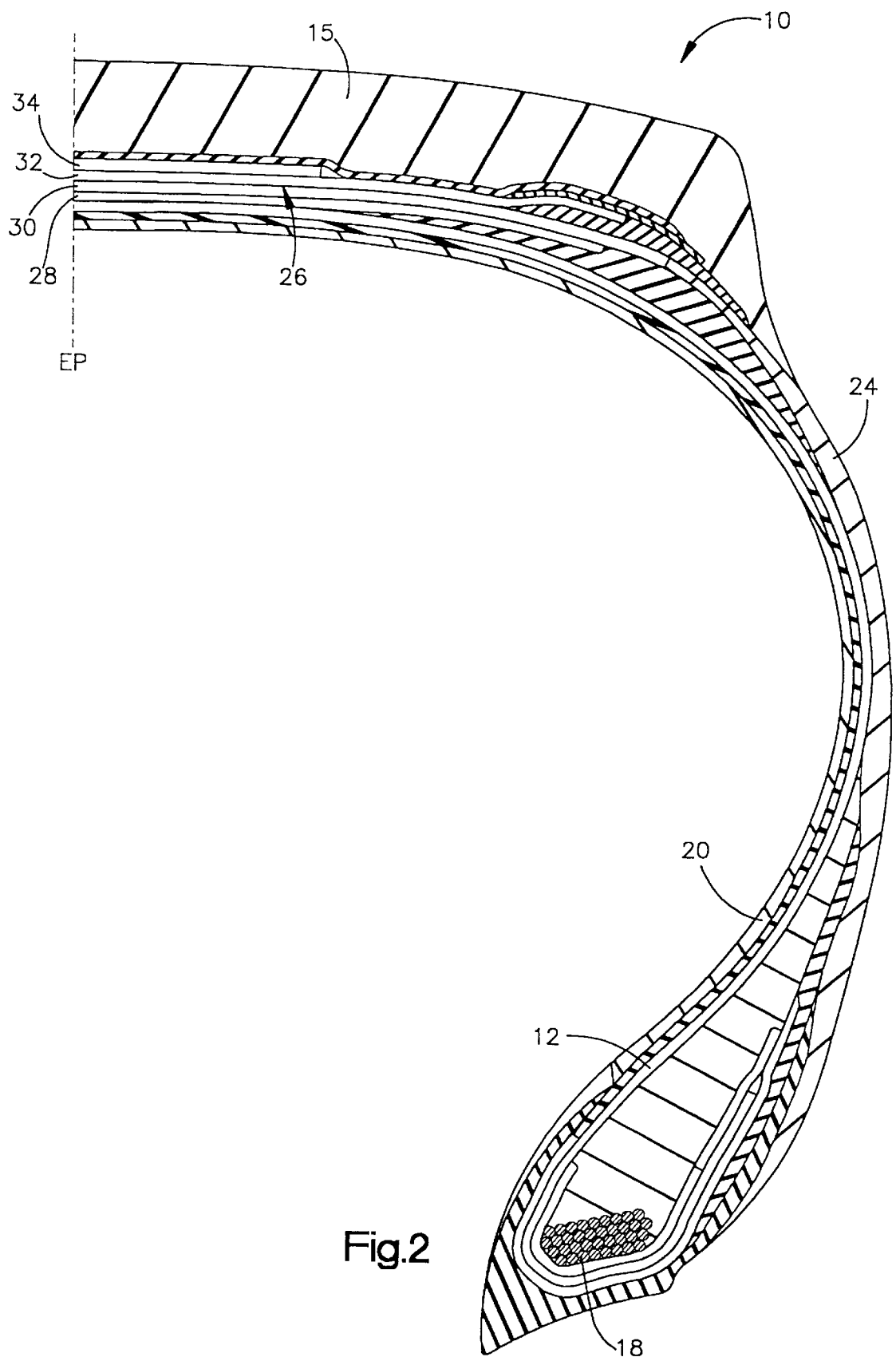
FIG. 2 illustrates a partial cross section of a second embodiment of a tire having a composite structure including four plies according to the present invention.

Referring to FIGS. 1 and 2 of the drawings, plies 12 and 14 are shown within a pneumatic tire 10 with a radial carcass wherein like elements have received like reference numerals. For the purposes of the present invention, a tire has a radial ply carcass structure when the cords of the carcass reinforcing ply, or plies 12,14 are oriented at angles in the range of 75° to 900° with respect to the equatorial plane (EP) of the tire.

In the instance where the metallic cords of the present invention are used to reinforce the carcass, only one of the two plies, if two are used, should be so reinforced. The other ply should be reinforced with some other form of reinforcement. It is preferred that, if two carcass plies are used, the metallic cord reinforced ply be the bottom (inner) carcass ply 14. Representative examples of reinforcement that can be used in the other non-metallic reinforced carcass ply is rayon, polyester and nylon.

The metallic cord reinforced carcass ply 12 has a layer of steel cords 30 arranged so as to have from about 8 to about 20 ends per inch (EPI) when measured in a tire circumferential direction at a location having a tire maximum width (MW). Preferably, the layer of steel cords 30 are arranged so as to have about 12 to about 16 ends per inch (EPI) at the location having a tire maximum width MW. In terms of metric units, the steel cords are arranged as to have from 3 to 8 ends per cm (EPC) when measured in a tire circumferential direction at a location having a tire maximum width. Preferably, the EPC ranges from 4 to 7 EPI. The above calculations for ends per inch are based upon the range of diameters or the overall cords, strength of the filaments and cords as well as the required strength requirement for the single carcass ply. For example, the high number of ends per inch would include the use of a lower diameter wire for a given strength versus a lower number of ends per inch for a lower diameter wire for the same strength. In the alternative, if one elects to use a monofilament of a given diameter, one may have to use more or less ends per inch depending on the strength of the wire.

The tire 10 has a pair of substantially inextensible annular beads 16,18 which are axially spaced apart from one another. Each of the beads 16,18 is located in a bead portion of the tire 10 which has exterior surfaces configured to be complimentary to the bead seats and retaining flanges of a rim (not shown) upon which the tire 10 is designed to be mounted. Plies 12,14 may be of side-by-side reinforcing cords of polyester or other material, or steel cord of the present invention and extend between the beads 16,18 with an axially outer portion of the carcass structure folded about each of the beads. While in the embodiment of FIG. 1, the carcass ply structure comprises two plies 12,14 of reinforcing material, it is understood that one or more carcass plies of any suitable material may be employed in certain embodiments and one or more plies of reinforcement according to this invention may be used as well.

Figure 3:
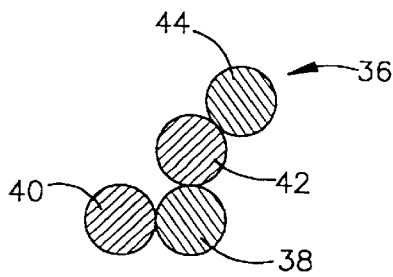
FIG. 3 shows the cross section through a cord in accordance with an embodiment of the present invention.

A layer of a low permeability material 20 may be disposed inwardly of the carcass plies 12,14, and contiguous to an inflation chamber defined by the tire and rim assembly. Elastomeric sidewalls 22,24 are disposed axially outwardly of the carcass structure. A circumferentially extending belt structure 26 comprising in the embodiments shown two layers of belts 28,30 (FIG. 1), or four layers of belts 28,30,32,34 (FIG. 2), each of which preferably includes steel reinforcing cords 36 as shown in FIG. 3. The belt structure 26 of FIG. 2 is characterized by the cords 36 having filaments with a tensile strength of at least 4000 MPA [$N/mm^2$] (called "ultra tensile" herein) for filaments with a 0.20 mm diameter. For example, cord 36, as shown in FIG. 3, has four filaments 38, 40, 42 and 44 (38–44) of ultra tensile steel wire. While two and four layer belts are illustrated in FIGS. 1 and 2, respectively, other numbers of belts can be substituted.

It will be appreciated that other laminates can be formed using principles of the present invention for reinforcing other articles such as industrial belts and that a single ply of the present invention can be used with known or conventional plies to also form new useful reinforced composite structures.

In a working example, the cords 36 are comprised of four filaments 38–44 of finely drawn, ultra tensile steel wire. There are a number of metallurgical embodiments which result in the tensile strength defined above, i.e. at least 4000 MPA, as ultra tensile (UT). One way of achieving UT strength is by merging the proper process as disclosed in U.S. Pat. No. 4,960,473, which is hereby incorporated by reference in its entirety herein, with a carbon rod microalloyed with one or more of the following elements: Cr, Si, Mn, Ni, Cu, V and B. The preferred chemistry is listed below:

| | |
|---|---|
| C | 0.88 to 1.0 |
| Mn | 0.30 to 0.50 |
| Si | 0.10 to 0.3 |
| Cr | 0.10 to 0.4 |
| V | 0 to 0.1 |
| Cu | 0 to 0.5 |
| Ni | 0 to 0.5 |
| Co | 0.2 to 0.1 |
| the balance being iron and residuals | |

The resulting rod is then drawn to a tensile strength equivalent to 4000 Mpa @ 0.20 mm.

TABLE 1 below gives calculated strength level description for ultra tensile filaments in comparison to previous high and super tensile steel filaments having a filament diameter of 0.20 mm. The ultra tensile steel has a higher value than any previously used steel cord or filament.

TABLE 1

HIGH TENSILE, SUPER TENSILE & ULTRA TENSILE STEEL CORD
Strength Level Description

| | High Tensile (HT) | Super Tensile (ST) | Ultra Tensile |
|---|---|---|---|
| Rating | 100 | 107 | 117 |
| Tensile Strength (MPa) for filament diameter (D) | 3400 | 3680 | 4000 |
| Tensile Strength (MPa) for filament diameter (D) | −1400×D +3680 | −2000×D +4050 | −2000×D +4400 |

The cords 36 used in the working example, as shown in FIG. 3, have a structure of four filaments 38, 40, 42 and 44 typically of 0.30 mm or 0.35 mm diameter ultra tensile steel wire with a cord breaking strength of at least 1,020 Newtons, plus or minus 5.0 percent. Each cord 36 has two filaments 38, 40 twisted together with a 16 mm lay length and these two filaments 38,40 are then twisted at a 16 mm lay length together in the same twist direction with the remaining two filaments 42,44 which are untwisted and parallel to each other when twisted together with the twisted filaments 38,40. This cord, commonly called a 2+2 construction is designated as 2+2x.30 UT or 2+2x.35 UT. The 2+2 construction is known for its openness and good rubber penetration resulting from the openness. The 0.30 and 0.35 designates the filament diameter in millimeters and the UT designates the material being ultra tensile steel.

TABLE 2

| | Former Cord Structure | | Ultra Tensile Cord Structure | |
|---|---|---|---|---|
| | Structure | Max Cord Gauge (mm) | Structure | Max Cord Gauge (mm) |
| Radial Passenger and Light Truck Belts | | | | |
| 1) | 2x.30HT | .60 | 2x.23UT | 0.46 |
| Radial Light Truck Belts | | | | |
| 2) | 2 + 2x.30HT | .90 | 2x.30 UT | 0.60 |
| 3) | 2 + 2x.30HT | .90 | 2x.35 UT | 0.70 |
| Radial Medium Truck Belts | | | | |
| 4) | 2 + 2x.35ST | 1.05 | 2 + 2x.30UT | 0.90 |
| | | 1.05 | 2 + 2x.33UT | 0.99 |
| | | 1.05 | 2 + 2x.35UT | 1.05 |
| 5) | 3 + 2x.35ST | 1.05 | 3 + 2x.30 UT | 0.90 |
| | | 1.05 | 3 + 2x.33 UT | 0.99 |
| | | 1.05 | 3 + 2x.35 UT | 1.o5 |
| 6) | 3 + 3x.35ST | 1.05 | 3 + 3x.30 UT | 0.90 |
| | | 1.05 | 3 + 3x.33 UT | 0.95 |
| | | 1.05 | 3 + 3x.35 UT | 1.05 |
| 7) | N + M×DST[1] | | N + Mx.30 UT | 0.90 |
| | | | N + Mx.33 UT | 0.95 |
| | | | N + Mx.35 UT | 1.05 |

Figure 5:
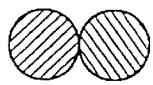
FIGS. 5 through 16 show the cross section through a cord in accordance with different embodiments of the present invention.
Figure 6:
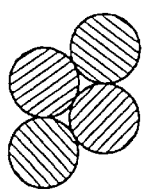

[1]Where N is any number from 1–5
M is any number from 1–5
D is any diameter from 0.18 to 0.38 mm Above in TABLE 2 are other embodiments of ultra tensile cord matched for comparison with the former tire cord, e.g., high tensile (HT) and super tensile (ST) steel cords which it replaced, the above example cord 36 being listed as 2 and 3. The illustrated examples of ultra tensile cord structure, candidates 1 and candidates 2, 3 and 4 above in TABLE 2, are shown in FIGS. 5 and 3, respectively, and show a reduction in cord gauge as compared with the corresponding former cord structures of the three candidates. When the new cord structures incorporate filaments having a smaller diameter than those of the previously noted corresponding former cord structures, there is a resulting reduction in gauge material and cost as compared with the former cord structures making the tires lighter in weight and less costly.

For equal filament diameters, the ultra tensile cords have higher strength and generally higher fatigue life over the predecessor high and super tensile cords. These advantages lead to elastomer products which have less reinforcement material and thus lower weight and cost. Further, the life of the product can be increased with the increase in fatigue life of the cord and its filaments.

Figure 7:
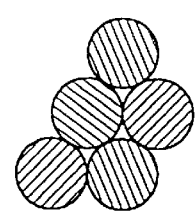
Figure 8:
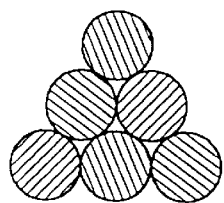
Figure 9:
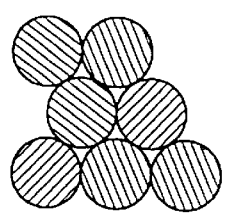

In a similar manner, the illustrated examples of ultra tensile cord structure, candidates 5 and 6 above in TABLE 2, are shown in FIGS. 7 and 8, respectively, and show a reduction in cord gauge as compared with the two mentioned corresponding former cord structures. Further, the new cord structures of small diameter filaments reduce gauge material and cost as compared with the previously noted former cord structures making the tires lighter in weight and less costly.

The following TABLE 3 shows other embodiments of ultra tensile ply structures matched for comparison with the former belts and carcass ply structures which they replace. Some former plies incorporate polyester or high tensile (HT) steel.

TABLE 3

| | Former Ply Structure | | Ultra Tensile Ply Structure | |
|---|---|---|---|---|
| | Structure | Max Cord Gauge (mm) | Structure | Max Cord Gauge (mm) |
| | Radial Passenger and Light Truck Plies | | | |
| 1) | 1100/3 polyester single ply | .66 | 2x.18 UT | .36 |
| 2) | 1100/2 polyester two ply | .56 | 3x.18 UT | .36 |
| | Radial Light Truck Plies | | | |
| 3) | 1440/3 polyester two ply | .76 | 1 + 5x.18UT with and without wrap | .54 |
| | Radial Medium Truck Belts | | | |
| 4) | 27x.175HT | 1.05 | 3x.22/9x.20 + 1UT | .84 |
| 5) | 3x.22/9x.20 + 1HT | .84 | 2 + 7x.22 + 1UT | .88 |
| 6) | 3x.22/9x.20 + 1HT | .84 | 1x.24 + 6x.22 + 1UT | .68 |
| 7) | 3x.22/9x.20 + 1HT | .84 | 1x.24 + 6x.22UT | .68 |
| | Off-The-Road Plies | | | |
| 8) | 7x19x.20 + 1HT | 3.00 | 7x19x.20 + 1UT | 3.00 |
| 9) | 7x19x.20 + 1HT | 3.00 | 7x12x.22 + 1UT | 2.34 |
| 10) | 7x19x.20 + 1HT | 3.00 | 7x12x.25 + 1UT | 3.02 |

Figure 10:
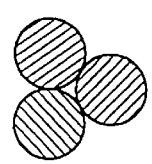

Candidates 1 and 2 above in TABLE 3 and illustrated in FIGS. 5 and 10, show a replacement of polyester ply with steel ply. The ply structures incorporating UT steel filaments are stronger and reduce the gauge and cost of the material, as compared with the previously noted former polyester ply structures making the tires lighter in weight and less costly.

Figure 11:
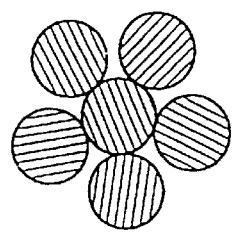

Candidate 3, above in TABLE 3, is related to radial light truck plies and is illustrated in FIG. 11, shows a replacement of polyester ply with steel ply.

Figure 12:
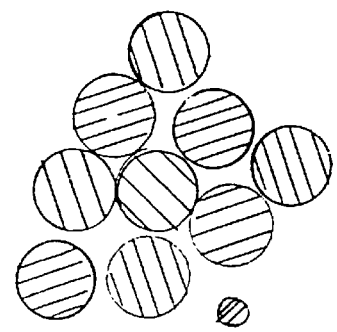
Figure 13:
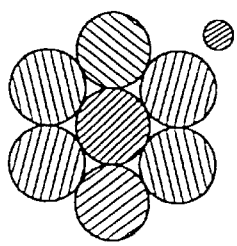
Figure 14:
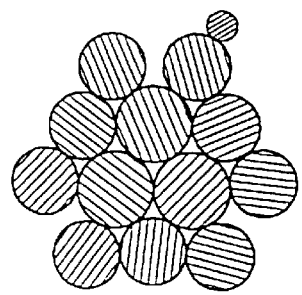

Further, Candidates 4, 5, 6 and 7 above in TABLE 3, are related to radial medium truck plies and are illustrated in FIGS. 14, 12 and 13. These candidates show a replacement of high tensile ply configurations with ultra tensile steel ply configurations. The ply structures of UT steel filaments are stronger and reduce gauge material and cost as compared with the previously noted former high tensile ply structures making the tires lighter in weight and less costly.

Figure 15:
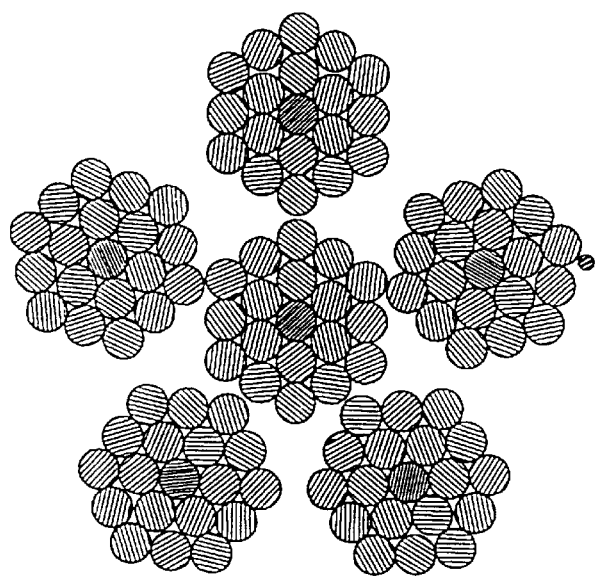
Figure 16:
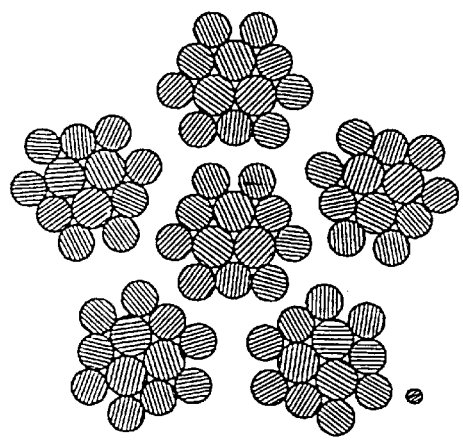

Candidates 8, 9 and 10 above in TABLE 3, are related to off-the-road plies as illustrated in FIGS. 15 and 16. These candidates show a replacement of a high tensile ply configuration, as shown in FIG. 15, with the corresponding ultra tensile steel ply configurations of FIGS. 15 and 16. As in the previous cases, the ply structures of UT steel filaments are stronger and reduce gauge material and cost as compared with the previously noted former high tensile ply structures making the tires lighter in weight and less costly.

Figure 4:
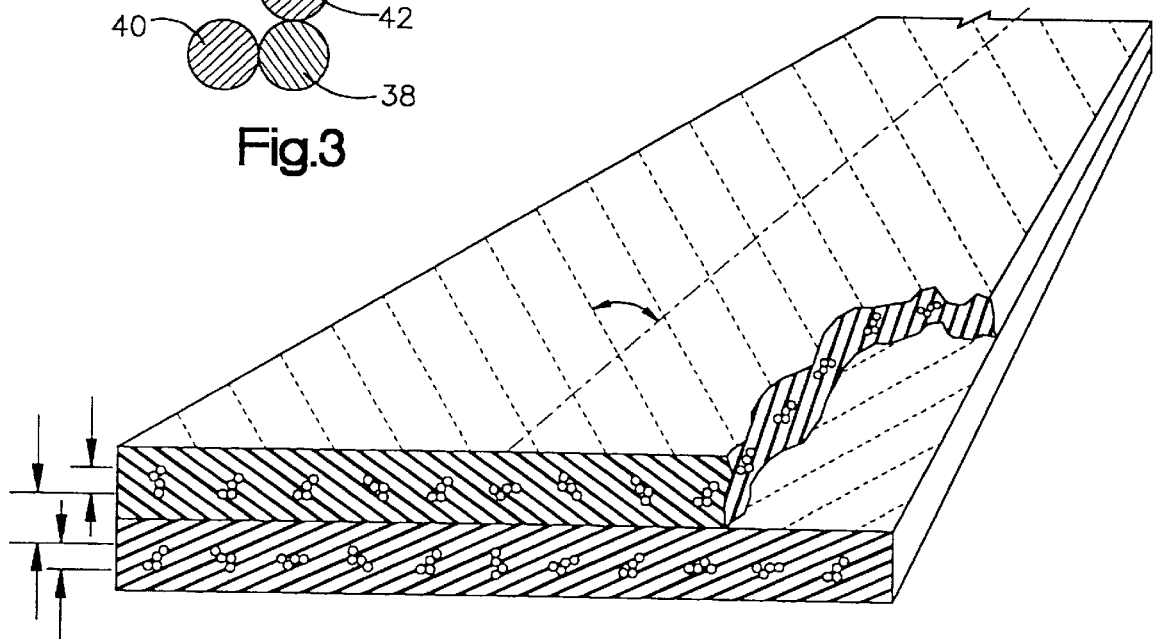
FIG. 4 is a schematic illustration in cross section of a composite, such as two abutted plies, in accordance with the present invention.

TABLE 4 below compares the current construction together with a benefit analysis of P195/75R14 passenger tires of two belts, as shown in FIG. 1 and depicted in FIG. 4, wherein the current two layer belts incorporate high tensile cable configurations and the disclosed two layer belts of the new construction incorporate ultra tensile cable configurations. Three candidates of ultra tensile construction are described with (a) equal strength, lower tire gauge, higher EPI and lower tire weight in candidate 1; (b) equal strength, identical tire gauge, lower EPI and less tire weight in candidate 2; and (c) increased strength, equal tire gauge, equal EPI and equal tire weight in candidate 3.

With candidate 1, when the diameter of the filaments was decreased from 0.30 mm high tensile to 0.23 mm ultra tensile, the EPI increased. Nevertheless, an equal strength was achieved with a lower tire gauge and significant savings in tire weight. With candidate 2, when the diameter of the filaments was held constant at 0.30 mm, the replacement of high tensile steel with ultra tensile steel resulted in a decrease in EPI and a lower weight tire of equal strength. With candidate 3, the replacement of high tensile steel with ultra tensile steel, while keeping the tire gauge and the EPI constant, resulted in a tire with the same weight and gauge, but with an approximate 16 percent increase in strength.

TABLE 4

ULTRA TENSILE STEEL CORD BENEFITS
BELTS - PASSENGER TIRES
P195/75R14

|   |   | Current Belt Structure | | Ultra Tensile Belt Structure | | |
|---|---|---|---|---|---|---|
|   |   | Construction | EPI | Construction | EPI | Benefits |
| 1) | Belt 1 | 2x.30 HT | 24 | 2x.23 UT | 34 | Equal Strength |
|   | Belt 2 | 2x.30 HT | 24 | 2x.23 UT | 34 | Lower Tire Weight |
|   |   | Gauge 0.096 in | | Gauge 0.080 in | | (0.5 lbs lower) |
|   |   | Weight 3.2 lbs | | Weight 2.7 lbs | | Lower Tire Gauge |
| 2) | Belt 1 | 2x.30 HT | 24 | 2x.30 UT | 20.5 | Equal Strength |
|   | Belt 2 | 2x.30 HT | 24 | 2x.30 UT | 20.5 | Lower Tire Weight |
|   |   | Gauge 0.096 in | | Gauge 0.096 in | | (0.20 lbs lower) |
|   |   | Weight 3.2 lbs | | Weight 3.0 lbs | | |
| 3) | Belt 1 | 2x.30 HT | 24 | 2x.30 UT | 24 | 16% Increased |
|   | Belt 2 | 2x.30 HT | 24 | 2x.30 UT | 24 | Strength |
|   |   | Gauge 0.096 in | | Gauge 0.096 in | | |
|   |   | Weight 3.2 lbs | | Weight 3.2 lbs | | |

TABLE 5 below compares the current construction together with a benefit analysis of LT215/85R16 LR-C light truck tires of two belts, as shown in FIG. 1 and depicted in TABLE 5. The current belt structure incorporates two layered belts of 2+2 high tensile cable configurations and the newly disclosed two layer belts incorporate ultra tensile cable configurations. Two candidates of ultra tensile construction with (a) equal strength, lower tire gauge, higher EPI and lower tire weight in candidate 1; and (b) equal strength, lower tire gauge, higher EPI and lower tire weight in candidate 2.

With candidate 1, the 2+2x.30 HT configuration of Belt 1 was replaced with a simpler 2x.30 UT configuration and the 2+2x.30 HT configuration of Belt 2 was replaced with a simpler 2x.23 UT configuration. In each case, the EPI increased. Nevertheless, an equal strength was achieved with a significant savings in tire weight and a lower tire gauge. With candidate 2, the 2+2x.30 HT configurations of Belt 1 and Belt 2 were each replaced with a simpler 2x.35 UT configuration. In each case, the EPI increased. Nevertheless, an equal strength was achieved with a significant savings in tire weight and a lower tire gauge.

tion in the current models and a simple 2x.30, 2x.23 or 2x.35 cord in the ultra-tensile models. In construction 1, to achieve equal strength between the current high tensile and the ultra-tensile examples, the EPI increased, the tire gauge was lower and a lower tire weight was achieved. In construction 2, the ultra-tensile filaments had a larger diameter and the EPI increased to maintain an equal strength. At the same time, both the tire gauge and the tire weight was lower.

TABLE 6 below compares the current construction together with a benefit analysis of LT215/85R16 LR-D radial light truck tires of two belts, as shown in FIG. 1. The current belt structure incorporates two layered belts of 2+2 high tensile cable configurations and the newly disclosed two layered belts which incorporates ultra tensile cable configurations. Three candidates of ultra tensile construction with (a) equal strength, lower tire gauge, higher EPI and lower tire weight in candidate 1; (b) equal strength, equal tire gauge, lower EPI and lower tire weight in candidate 2; and (c) higher strength, equal tire gauge, equal EPI and equal tire weight in candidate 3.

With candidate 1, the 2+2x.30 HT configuration of Belts 1 and 2 were both replaced with a simpler 2x.35 UT

TABLE 5

ULTRA TENSILE STEEL CORD BENEFITS
BELTS - RADIAL LIGHT TRUCK TIRES
LT215/85R16 LR-C

|   |   | Current Belt Structure | | Ultra Tensile Belt Structure | | |
|---|---|---|---|---|---|---|
|   |   | Construction | EPI | Construction | EPI | Benefits |
| 1) | Belt 1 | 2 + 2x.30 HT | 13 | 2x.30 UT | 22 | Equal Strength |
|   | Belt 2 | 2 + 2x.30 HT | 13 | 2x.30 UT | 22 | Lower Tire Weight |
|   |   | Gauge 0.112 in | | Gauge 0.092 in | | (0.7 lbs lower) |
|   |   | Weight 4.8 lbs | | Weight 4.1 lbs | | Lower Tire Gauge |
| 2) | Belt 1 | 2 + 2x.30 HT | 13 | 2x.35 UT | 17 | Equal Strength |
|   | Belt 2 | 2 + 2x.30 HT | 13 | 2x.35 UT | 17 | Lower Tire Weight |
|   |   | Gauge 0.112 in | | Gauge 0.100 in | | (0.4 lbs lower) |
|   |   | Weight 4.8 lbs | | Weight 4.4 lbs | | Lower Tire Gauge |

Another comparison of high tensile and ultra-tensile cord is given in TABLE 5 where two current high tensile belt structures are compared with two candidates of ultra-tensile belt structures in LT215/85R1G LR-C radial light truck tires. These tires incorporated two belts with 2+2 type construcconfiguration. In each case, the EPI increased. Nevertheless, an equal strength was achieved with a significant savings in tire weight and a lower tire gauge. With candidate 2, the 2+2x.30 HT configurations of Belt 1 and Belt 2 were each replaced with 2+2x.30 UT configurations. In each case, the EPI decreased while maintaining an equal strength, an equal tire gauge and a reduction in tire weight. With candidate 3, the 2+2x.30 HT configurations of Belt 1 and Belt 2 were again replaced with 2+2x.30 UT configurations. However, in each case, the EPI remained the same. The result was a significantly increased strength, while the tire gauge and the tire weight remained the same.

In each case, the EPI increased. Nevertheless, an equal strength was achieved with a significant savings in tire weight and a lower tire gauge. With candidate 2, the 2+2x.35 HT configurations of Belt 1 and Belt 2 were each replaced with 2+2x.35 UT configurations. In each case, the EPI

TABLE 6

ULTRA TENSILE STEEL CORD BENEFITS
BELTS - RADIAL LIGHT TRUCK TIRES
LT215/85R16 LR-D

| | | Current Belt Structure | | Ultra Tensile Belt Structure | | |
|---|---|---|---|---|---|---|
| | | Construction | EPI | Construction | EPI | Benefits |
| 1) | Belt 1 | 2 + 2x.30 HT | 17 | 2x.35 UT | 22 | Equal Strength |
| | Belt 2 | 2 + 2x.30 HT | 17 | 2x.35 UT | 22 | Lower Tire Weight |
| | | Gauge 0.112 in | | Gauge 0.100 in | | (0.4 lbs lower) |
| | | Weight 5.1 lbs | | Weight 4.7 lbs | | Lower Tire Gauge |
| 2) | Belt 1 | 2 + 2x.30 HT | 17 | 2 + 2x.30 UT | 14.5 | Equal Strength |
| | Belt 2 | 2 + 2x.30 HT | 17 | 2 + 2x.30 UT | 14.5 | Lower Tire Weight |
| | | Gauge 0.112 in | | Gauge 0.112 in | | (.2 lbs lower) |
| | | Weight 5.1 lbs | | Weight 4.9 lbs | | |
| 3) | Belt 1 | 2 + 2x.30 HT | 17 | 2 + 2x.30 UT | 17 | 16% Increased |
| | Belt 2 | 2 + 2x.30 HT | 17 | 2 + 2x.30 UT | 17 | Strength |
| | | Gauge 0.112 in | | Gauge 0.112 in | | |
| | | Weight 5.1 lbs | | Weight 5.1 lbs | | |

TABLE 7 below compares the current construction together with a benefit analysis of LT235/85R16 LR-E light truck tires of two belts, as shown in FIG. 1 and depicted in TABLE 7. The current belt structure incorporates two layered belts of 2+2 super tensile cable configurations and the newly disclosed two layer belts incorporates ultra tensile cable configurations. Three candidates of ultra tensile condecreased while maintaining an equal strength, an equal tire gauge and a reduction in tire weight. With candidate 3, the 2+2x.35 ST configurations of Belt 1 and Belt 2 were again replaced with 2+2x.35 UT configurations. However, in each case, the EPI remained the same. The result was an increased strength, while the tire gauge and the tire weight remained the same.

TABLE 7

ULTRA TENSILE STEEL CORD BENEFITS
BELTS - RADIAL LIGHT TRUCK TIRES
LT235/85R16 LR-E

| | | Current Belt Structure | | Ultra Tensile Belt Structure | | |
|---|---|---|---|---|---|---|
| | | Construction | EPI | Construction | EPI | Benefits |
| 1) | Belt 1 | 2 + 2x.35 ST | 17.5 | 2 + 2x.30 UT | 21 | Equal Strength |
| | Belt 2 | 2 + 2x.35 ST | 17.5 | 2 + 2x.30 UT | 21 | Lower Tire Weight |
| | | Gauge 0.126 in | | Gauge 0.114 in | | (0.6 lbs lower) |
| | | Weight 7.2 lbs | | Weight 6.6 lbs | | Lower Tire Gauge |
| 2) | Belt 1 | 2 + 2x.35 ST | 17.5 | 2 + 2x.35 UT | 16 | Equal Strength |
| | Belt 2 | 2 + 2x.35 ST | 17.5 | 2 + 2x.35 UT | 16 | Lower Tire Weight |
| | | Gauge 0.126 in | | Gauge 0.126 in | | (0.3 lbs lower) |
| | | Weight 7.2 lbs | | Weight 6.9 lbs | | |
| 3) | Belt 1 | 2 + 2x.35 ST | 17.5 | 2 + 2x.35 UT | 17.5 | 12% Increased |
| | Belt 2 | 2 + 2x.35 ST | 17.5 | 2 + 2x.35 UT | 17.5 | Strength |
| | | Gauge 0.126 in | | Gauge 0.126 in | | |
| | | Weight 7.2 lbs | | Weight 7.2 lbs | | | struction with (a) equal strength, lower tire gauge, higher EPI and lower tire weight in candidate 1; (b) equal strength, equal tire gauge, lower EPI and lower tire weight in candidate 2; and (c) higher strength, equal tire gauge, equal EPI and equal tire weight in candidate 3.

With candidate 1, the 2+2x.35 ST configuration of Belts 1 and 2 were both replaced with a 2+2x.30 UT configuration.

TABLE 8 below compares a current two-ply P225/P75R15 passenger tire with an ultra tensile ply structure. With the candidate 1, equal strength was achieved with lower tire gauge, an increase in EPI, and a slight increase in weight. With candidate 2, equal strength was achieved with lower tire gauge, an equal EPI and a decrease in tire weight.

With candidate 1, the 1100/2 polyester configurations of Plies 1 and 2 were replaced with 2x.18 UT configuration. In this case, the EPI increased while maintaining an equal strength, a lower tire gauge and a lower tire weight. With candidate 2, the 1100/2 polyester configuration of Plies 1 and 2 were replaced with 3x.18 UT configuration. In this case, the strength and EPI remained constant while achieving a lower tire gauge and a lower tire weight.

ply incorporates a 3+2x.33 ultra tensile for each of the belts and a 1x.24/6x.22+1 UT for the ply. Note that the EPI of belts 1 and 4, and belts 2 and 3 remain the same for both the current and new constructions while the EPI for the new ply increases. The benefits achieved by the use of the ultra tensile configurations is an increase in the rivet of belts 2 and

TABLE 8

ULTRA TENSILE STEEL CORD BENEFITS
PLY - PASSENGER TIRES
P225/75R15

| | | Current Belt Structure | | Ultra Tensile Belt Structure | | |
|---|---|---|---|---|---|---|
| | | Construction | EPI | Construction | EPI | Benefits |
| 1) | Ply 1 | 1100/2 Poly | 30 | 2x.18 UT | 43 | Equal Strength |
| | Ply 2 | 1100/2 Poly | 30 | | | Lower Tire Weight |
| | | Gauge 0.084 in | | Gauge 0.044 in | | (.8 lbs lower) |
| | | Weight 3.4 lbs | | Weight 2.6 lbs | | Lower Tire Gauge |
| 2) | Ply 1 | 1100/2 Poly | 30 | 3x.18 UT | 30 | Equal Strength |
| | Ply 2 | 1100/2 Poly | 30 | | | Lower Tire Weight |
| | | Gauge 0.084 in | | Gauge 0.044 in | | (.8 lbs lower) |
| | | Weight 3.4 lbs | | Weight 2.6 lbs | | Lower Tire Gauge |

TABLE 9 compares a current two-ply polyester construction with an ultra tensile construction in LT235/85R16 radial light truck tires of a load range E. Referring to the candidate, an equal strength was maintained while achieving lower tire weight and lower tire gauge. When the 1440/3 polyester configuration of Plies 1 and 2 were replaced with 1+5x.18 UT configuration, the EPI slightly increased, and an equal strength was achieved with a reduction in tire weight and tire gauge.

3, a tire weight reduction, a tire cost reduction and improved corrosion resistance in the ply.

Referring to candidate 2, the belts of the current configurations were replaced by belts with a 3+4x.38 UT configuration and an EPI which is lower than that in the current belts. The 3x.22/9x.20+1 HT cable configuration in the ply is replaced by a 1x.24/6x.22+1 UT cable configuration in the ply. The advantage of the configu-

TABLE 9

ULTRA TENSILE STEEL CORD BENEFITS
PLY - RADIAL LIGHT TRUCK TIRES
LT235/85R16 LR-E

| | | Current Belt Structure | | Ultra Tensile Belt Structure | | |
|---|---|---|---|---|---|---|
| | | Construction | EPI | Construction | EPI | Benefits |
| 1) | Ply 1 | 1440/3 Poly | 27 | 1 + 5x.18 UT | 28 | Equal Strength |
| | Ply 2 | 1440/3 Poly | 27 | | | Lower Tire Weight |
| | | Gauge 0.118 in | | Gauge 0.061 in | | (0.9 lbs lower) |
| | | Weight 6.6 lbs | | Weight 5.7 lbs | | Lower Tire Gauge |

TABLE 10 below compares the current construction with a benefit analysis of 11R24.5 LR-G radial medium truck tires of four belts, as shown in FIG. 2. With candidate 1, the current belt structure includes four layered belts of 3+2 super tensile cable configurations and a ply of 3x.22/9x.20+1 high tensile cable. The new disclosed four layer belts and single rations of candidate 2 is a significant increase in the rivet of belts 2 and 3, a tire weight reduction, a tire cost reduction, improved corrosion resistance in the ply and single belt wire construction which is applicable to all of the load ranges for the radial medium truck tires.

TABLE 10

ULTRA TENSILE STEEL BENEFITS RADIAL MEDIUM TRUCK TIRES 11R24.5 LR-G

| | | Current Belt Structure | | Ultra Tensile Belt Structure | | |
|---|---|---|---|---|---|---|
| | | Construction | EPI | Construction | EPI | Benefits |
| 1) | Belt 1 | 3 + 2x.35 ST | 10 | 3 + 2x.33 UT | 10 | Rivet increased 7% in belts 2 and 3. |
| | Belt 2 | 3 + 2x.35 ST | 14 | 3 + 2x.33 UT | 14 | Tire weight reduced by 2.8 lbs. |
| | Belt 3 | 3 + 2x.35 ST | 14 | 3 + 2x.33 UT | 14 | Tire cost reduced. |
| | Belt 4 | 3 + 2x.35 ST | 10 | 3 + 2x.33 UT | 10 | Improved corrosion resistance in ply. |
| | Ply | 3x.22/9x.20 + 1 HT | 16 | 1x.24/6x.22 + 1 UT | 20 | |
| 2) | Belt 1 | 3 + 2x.35 ST | 10 | 3 + 4x.38 UT | 09 | Rivet increased 224% in belts 2 and 3. |
| | Belt 2 | 3 + 2x.35 ST | 14 | 3 + 4x.38 UT | 09 | Tire weight reduced 0.7 lbs. |
| | Belt 3 | 3 + 2x.35 ST | 14 | 3 + 4x.38 UT | 09 | Tire cost reduced. |
| | Belt 4 | 3 + 2x.35 ST | 10 | 3 + 4x.38 UT | 09 | Improved corrosion resistance in ply. |
| | Ply | 3x.22/9x.20 + 1 HT | 16 | 1x.24/6x.22 + 1 UT | 20 | One belt wire construction applicable to all load ranges. |

TABLE 11 below compares the current construction with a benefit analysis of 11R24.5 LR-H radial medium truck tires of four belts, as shown in FIG. 2. With candidate 1, the current belt structure includes four layered belts of 3+2 and 3+3 super tensile cable configurations and a ply of 3/9/15x.175+1 HT cable. The newly disclosed four layer belts and single ply incorporates a 3+2x.33 UT for belts 1 and 4, a 3+3x.33 UT for belts 2 and 3 and a 3x.22/9x.20+1 UT for the ply. Note that the EPI of belts 1 and 4 and belts 2 and 3 remain the same for both the current and new constructions while the EPI for the new ply construction increases. The benefits achieved by the use of the ultra tensile configurations is an increase in the rivet of belts 2 and 3, a tire weight reduction and a tire cost reduction.

Referring to candidate 2, the belts of the current configurations were replaced by belts with a 3+4x.38 UT configuration and an EPI which is lower than that in the current belts. The 3/9/15x.175+1 HT cable configuration in the ply is replaced by a 3x.22/9x.20+1 UT cable configuration in the ply. The advantage of the configurations of candidate 2 is a significant increase in the rivet of belts 2 and 3, a tire weight reduction, a tire cost reduction and single belt wire construction which is applicable to all of the load ranges for the radial medium truck tires.

TABLE 11

ULTRA TENSILE STEEL BENEFITS RADIAL TRUCK TIRES 11R24.5 LR-H

| | | Current Belt Structure | | Ultra Tensile Belt Structure | | |
|---|---|---|---|---|---|---|
| | | Construction | EPI | Construction | EPI | Benefits |
| 1) | Belt 1 | 3 + 2x.35 ST | 10 | 3 + 2x.33 UT | 10 | Rivet increased 10% in belts 2 and 3. |
| | Belt 2 | 3 + 3x.35 ST | 16 | 3 + 3x.33 UT | 16 | Tire weight reduced by 2.9 lbs. |
| | Belt 3 | 3 + 3x.35 ST | 16 | 3 + 3x.33 UT | 16 | Tire cost reduced. |
| | Belt 4 | 3 + 2x.35 ST | 10 | 3 + 2x.33 UT | 10 | |
| | Ply | 3/9/15x.175 + 1 HT | 13 | 3x.22/9x.20 + 1 UT | 19 | |
| 2) | Belt 1 | 3 + 2x.35 ST | 10 | 3 + 4x.38 UT | 09 | Rivet increased 225% in belts 2 and 3. |
| | Belt 2 | 3 + 3x.35 ST | 16 | 3 + 4x.38 UT | 11 | Tire weight reduced 1.6 lbs. |
| | Belt 3 | 3 + 3x.35 ST | 16 | 3 + 4x.38 UT | 11 | Tire cost reduced. |
| | Belt 4 | 3 + 2x.35 ST | 10 | 3 + 4x.38 UT | 09 | One belt wire construction applicable to all load ranges. |
| | Ply | 3/9/15x.175 + 1 HT | 13 | 3x.22/9x.20 + 1 UT | 19 | |

By utilizing ultra tensile steel filament of at least 4000 MPa at a 0.20 mm diameter, several options become available in steel cord design for Off-The-Road (OTR) pneumatic tires, as described in TABLE 12 below. Utilization of the higher tensile strength materials combined with simplification and/or variations of current steel cord construction will satisfy the OTR tire requirements of higher inch strength while increasing the rivet area between cords. For example, the steel cord cable construction currently used for ply reinforcement in OTR tires for sizes 36.00R51 and larger is 7+19x.20+1 HT, as shown in TABLES 3 and 13. The filament tensile strength is specified as 3300 MPa at 0.20 mm filament diameter. The average cable breaking load is 11,600 N and is used at 6.4 ends/inch thus giving an inch strength of 74,240 N which satisfies the design requirement of 73,975 N. The cable gauge of 3.0 mm yields a rivet of 0.965 mm.

A major design parameter which may be varied in a reinforced composite of elastomer is the end count in end per inch (EPI), i.e., the number of cords per unit length in the lateral direction to the direction in which the elastomer is being reinforced. TABLE 12 below lists examples of a current high tensile construction and possible ultra tensile constructions, see candidates 1–3 and FIGS. 15 and 16, showing the general increase in rivet as the increased strength of the ultra tensile samples allowed a reduction in EPI. At the other extreme, as cord diameter is reduced and the end count increased to off-set it, the rivet is reduced. Generally, a minimum rivet of 0.018" (0.46 mm) must be maintained to give proper penetration of elastomers between cords when they are so embedded. This minimum rivet is particularly obtainable with the smaller diameter and simpler (less filaments in a cord) cord construction of candidates 1, 2 and 3.

TABLE 13

| Construction | Gauge (mm) | Break Load (N) | EPI | Inch-Stretch (N) | Rivet (mm) |
|---|---|---|---|---|---|
| Current Construction | | | | | |
| 7×19×.20 + 1HT | 3.0 | 11,600 | 6.4 | 74,240 | .965 |
| Ultra Tensile Construction | | | | | |
| 1. 7×19×.20 + 1UT | 3.0 | 13,570 | 5.5 | 74,630 | 1.62 |
| 2. 7×12×.22 + 1UT | 2.34 | 10,500 | 7.1 | 74,550 | 1.24 |
| 3. 7×12×.25 + 1UT | 3.02 | 13,000 | 5.7 | 74,100 | 1.44 |

Candidates 1, 2 and 3 satisfy the tire design requirements of 74,240 N inch-strength for 36.00R51 through 40.00R57 OTR tires while providing increased rivet in all cases (greater than 0.96 mm). This increased rivet allows more rubber penetration between cords giving greater strike-through. In addition, candidate 1, when used at 6.4 EPI (not shown), has a rivet area between cords of 0.965 mm (as with the current construction) while providing an inch-strength of 83,200 N. This value of inch-strength exceeds the requirement of 79,800 N/inch for a new, larger 44.00R57 OTR tire.

It is apparent that there has been provided, in accordance with this invention, a strip of ply stock reinforced with steel monofilaments or cords for use in a tire. The strip of reinforced, ply stock satisfies the objects, means and advantages set forth hereinbefore.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A pneumatic tire with a carcass having parallel cords, two sidewalls spaced apart a distance, which in the axial direction determines the general width of the tire section, two beads each one of which around which are turned up, from the inside toward the outside, the ends of the cords of the carcass, a tread disposed on the crown of said carcass, a belt structure that is circumferentially inextensible interposed between the tread and the carcass, and carcass plies disposed in said sidewalls between said two beads and said crown of said carcass, said belt structure having a width that is substantially equal to that of the tread and having carcass plies of elastomeric fabric reinforced with metallic cords, said metallic cords having a 1+5 cord construction and being comprised of a plurality of filaments having a diameter (D) ranging from 0.18 to 0.38 mm, each filament having at least a tensile strength of $-2000 \times D + 4400$ MPa, where D is the filament diameter in mm.

2. The pneumatic tire of claim 1 wherein said metallic cords are steel cords arranged so as to have from about 8 to 20 ends per inch when measured in a tire circumferential direction at a location having a tire maximum width.

3. The pneumatic tire of claim 2 wherein the steel cords are arranged so as to have about 12 to 16 ends per inch.

4. The pneumatic tire of claim 1 wherein D is 0.18 mm.

* * * * *